United States Patent [19]
Kuo

[11] Patent Number: 5,526,240
[45] Date of Patent: Jun. 11, 1996

[54] BICYCLE STOP LIGHT

[76] Inventor: Kuan-Ju Kuo, 3F, No. 7, Yih-Min Road, Taipei, Taiwan

[21] Appl. No.: 511,220

[22] Filed: Aug. 4, 1995

[51] Int. Cl.$^6$ ............................................. B62J 6/00
[52] U.S. Cl. ............................................. 362/72; 200/61.12
[58] Field of Search ............................ 340/432, 479; 200/61.12; 362/72, 802

[56] References Cited

U.S. PATENT DOCUMENTS

| | | | |
|---|---|---|---|
| 3,878,387 | 4/1975 | Kovacic | 362/72 |
| 4,792,882 | 12/1988 | Guevremont | 362/72 |
| 4,896,138 | 1/1990 | Nickols | 362/72 X |
| 4,899,023 | 2/1990 | Shu-Hwa | 200/61.12 |

Primary Examiner—Stephen F. Husar
Attorney, Agent, or Firm—Morton J. Rosenberg; David I. Klein

[57] ABSTRACT

A bicycle stop light including a lamp assembly mounted on the rear fender of the bicycle and consisting of a flash lamp set and a battery, and a control switch mounted around the brake cable of the bicycle's rear brake, the control switch consisting of two opposite caps and a bellows tube connected between the caps and a metal spring received inside the bellows tube and fixed to one cap, wherein when the brake cable is pulled to stop the bicycle, the metal spring is forced to contact two metal contacts, which are made on one cap and connected to the two opposite terminals of the battery, causing the flash lamp set turned on to give a flashing light.

7 Claims, 4 Drawing Sheets

BICYCLE STOP LIGHT

BACKGROUND OF THE INVENTION

The present invention relates to a bicycle stop light which is automatically turned on to give a flashing light when the brake cable is pulled to stop the bicycle.

Regular bicycles do not equipped with any stop light. Therefore, when a bicycled rider suddenly stops the bicycle, the vehicle comes from behind may run into the back of the bicycle. This accident tends to happen during a raining day or at the night.

European patent application No. 89830160 (publication No. EP 337 956 A2) discloses a saddle for cycles, motorcycles and the like, which comprises a lamp at the back side of the body of the saddle, and a control switch fixed to the brake cable of the bicycle. When the brake cable is pulled to stop the bicycle, moving elements of the control switch are lifted to switch on the control switch, and therefore the lamp is turned on to give off light. Because the control switch is complicated, the cost of the saddle is high. Another drawback of this structure of saddle is that the moving elements of the control switch tend to be damaged when they are lifted excessively. Furthermore, because the lamp is installed in the saddle, they cannot be installed in a regular bicycle unless the original bicycle saddle is removed.

SUMMARY OF THE INVENTION

The present invention has been accomplished under the circumstances in view. It is one object of the present invention to provide a bicycle stop light which is simple in structure and inexpensive to manufacture. It is another object of the present invention to provide a bicycle stop light which is durable in use. It is still another object of the present invention to provide a bicycle stop light which can be installed in any of a variety of bicycles without changing any part of the bicycle.

According to the present invention, the bicycle stop light comprises a control switch and a lamp assembly. The control switch is mounted around the brake cable and stopped against the brake hanger of the bicycle. The lamp assembly can be mounted on the rear fender, the saddle, or the back part of the bicycle. The control switch comprises a rear cap mounted around the brake cable and stopped against the brake hanger and having a first metal contact and a second metal contact, a front cap mounted around and fixed to the brake cable by a fastening device, a bellows tube stopped between the front cap and said rear cap, a metal spring mounted around the brake cable inside the bellows tube and having a fixed end fixed to the front cap and a free end spaced from the first metal contact and the second metal contact. The lamp assembly is controlled comprises a DC power supply, and a flash lamp set. The DC power supply is connected to the flash lamp set through the first metal contact and the second metal contact. The bellows tube is compressible and molded from flexible plastics. The length of the metal spring is shorter than the bellows tube. Therefore, when the rear brake of the bicycle does no work, the metal spring is moved away from the first metal contact and the second metal contact. However, when the brake cable is pulled to stop the bicycle, the metal spring is forced to contact the first metal contact and the second metal contact, causing the flash lamp set turned on to give a flashing light. The lamp assembly further comprises a manual switch for controlling the operation of the flash lamp set manually.

BRIEF DESCRIPTION OF THE DRAWINGS

FIG. 5 is similar to FIG. 4 but showing the brake cable pulled and the control switch switched on.

DETAILED DESCRIPTION OF THE PREFERRED EMBODIMENT

Figure 1:
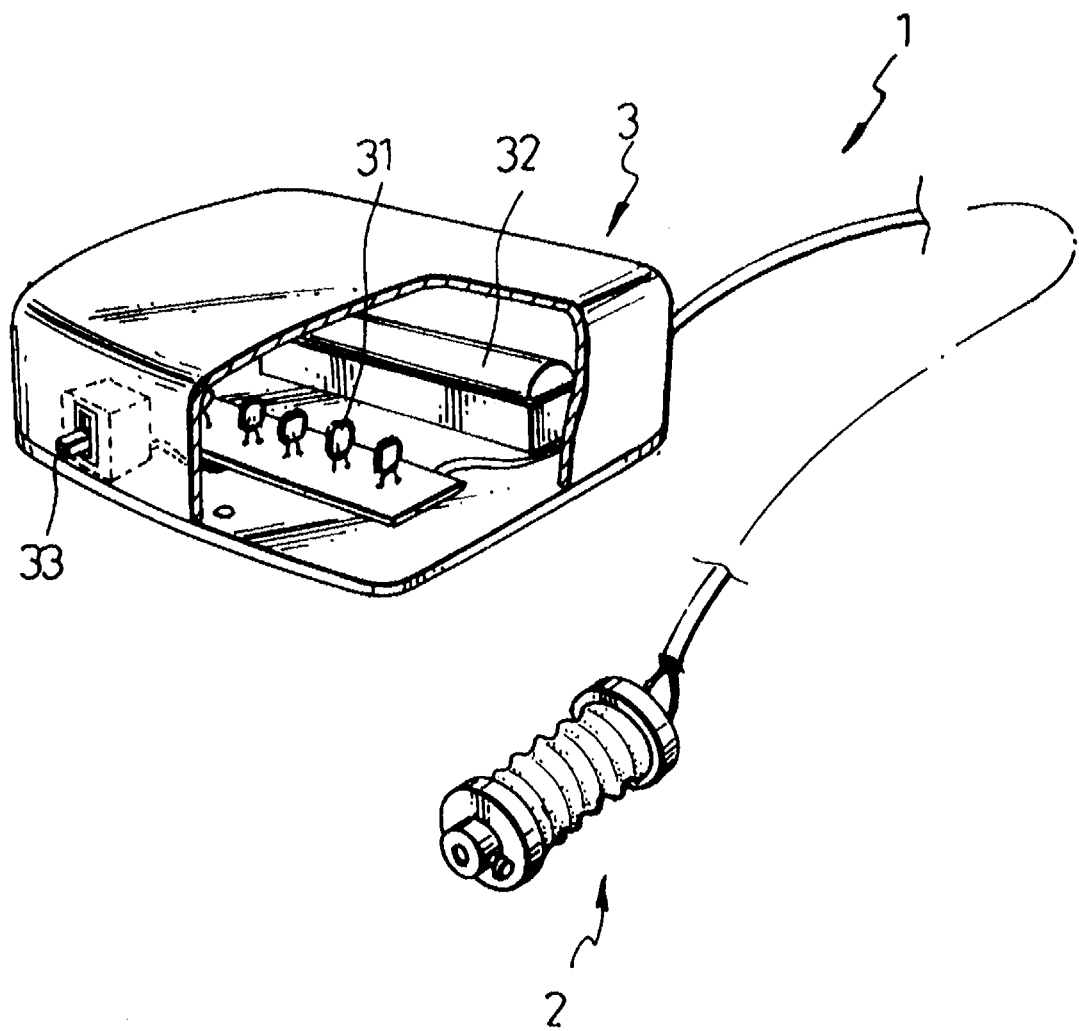
FIG. 1 is a cutaway of a bicycle stop light according to the present invention.

Referring to FIG. 1, a bicycle stop light, referenced by 1, is shown comprised of a control switch 2 and a lamp assembly 3. The lamp assembly 3 comprises a battery power supply 32, a flash lamp set 31 connected to the battery power supply 32 and controlled to give a flashing light, and a manual switch 33 for controlling the operation of the flash lamp set 31 manually.

Figure 2:
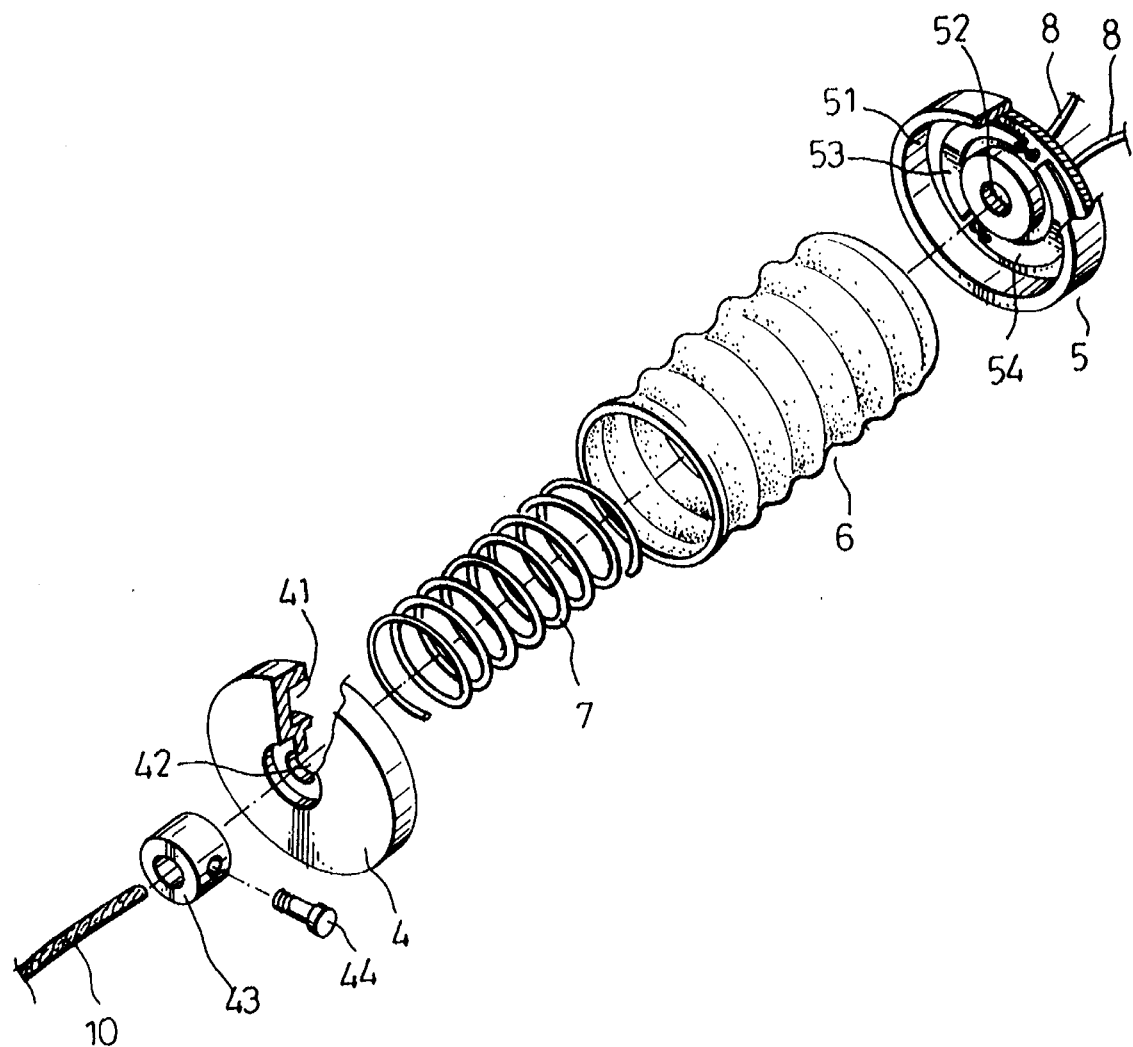
FIG. 2 is an exploded view of the control switch for the bicycle stop light shown in FIG. 1.

Referring to FIG. 2, the control switch 2 comprises a front cap 4, which has a center through hole 42 and a back annular groove 41 around the center through hole 41, a front cap 5, which has a center through hole 52, a back chamber 51, a first metal contact 53 and a second metal contact 54 spaced inside the back chamber 51, a bellows tube 6 stopped between the front cap 4 and the rear cap 5, and a metal spring 7 received inside the bellows tube 6 and having one end fastened to the back annular groove 41 of the front cap 4.

Referring to FIGS. 1 and 2 again, the flash lamp set 31 of the lamp assembly is connected to the first metal contact 53 and second metal contact 54 of the rear cap 5 by an electric cable 8.

Figure 3:
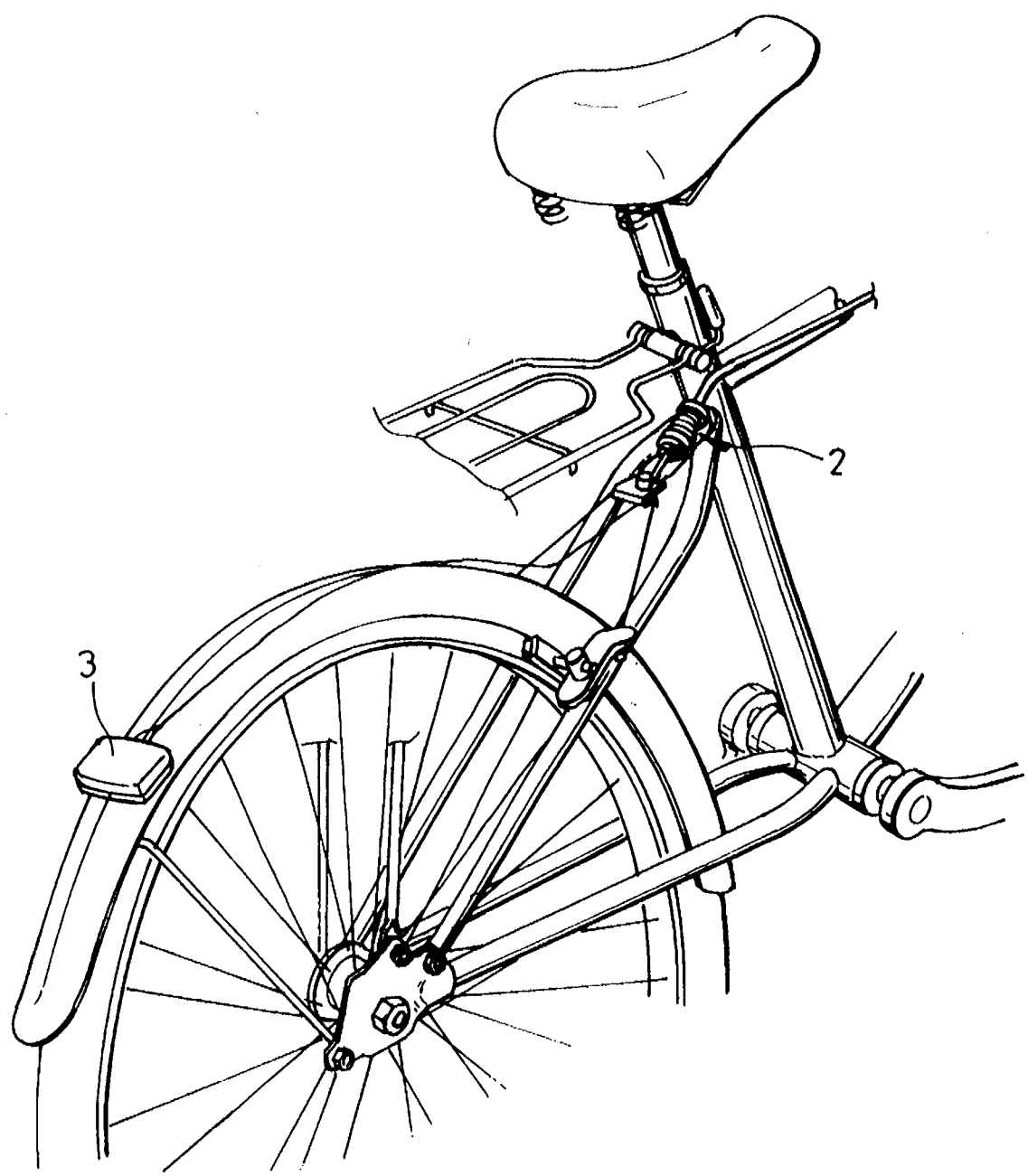
FIG. 3 is an applied view showing the bicycle stop light of the present invention installed in the bicycle.

Referring to FIG. 3, the control switch 2 is fastened to the brake cable of the bicycle, and the lamp assembly 3 is mounted on the rear fender of the bicycle.

Figure 4:
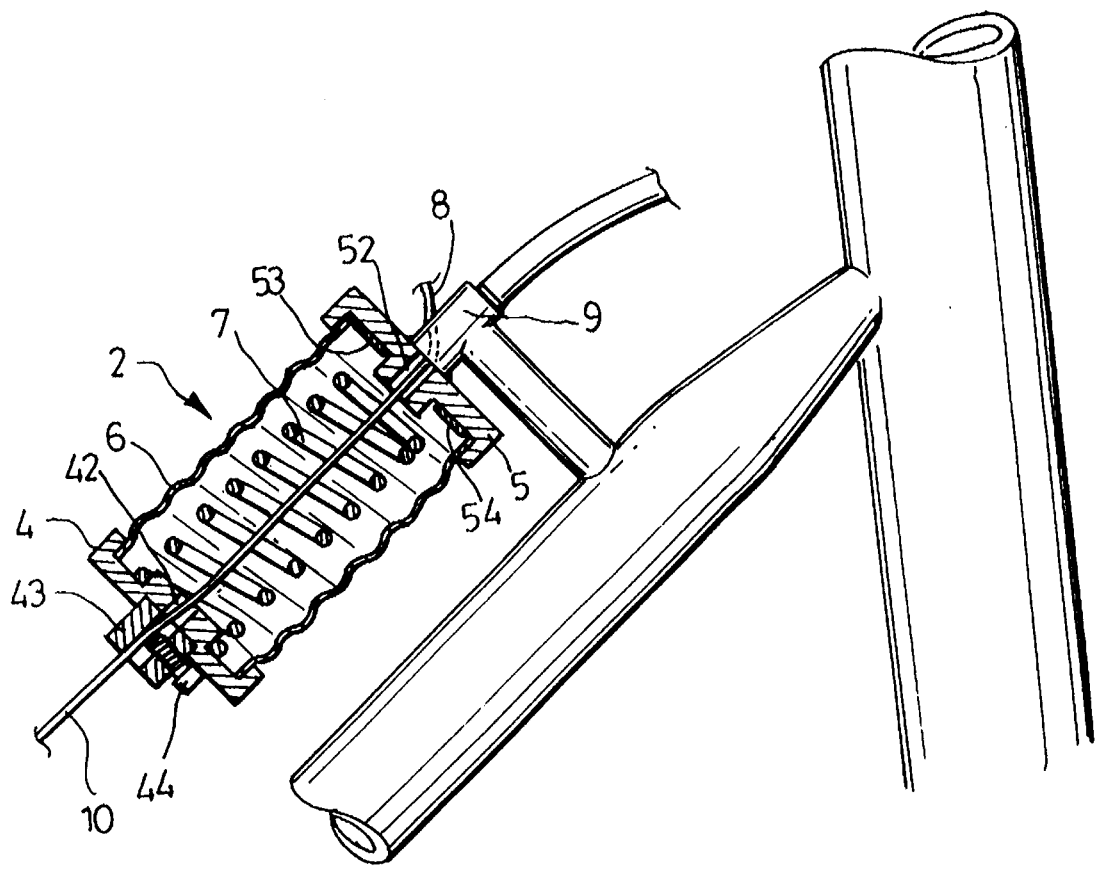
FIG. 4 is a sectional view in an enlarged scale taken on a part of FIG. 3, showing the control switch installed in the brake cable.

Referring to FIG. 4, the control switch 2 is fastened to the brake hanger 9 of the bicycle rear brake and mounted around the brake cable 10, permitting the brake cable 10 to pass through a metal ring 43, the center through hole 42 on the front cap 4, the metal spring 7, the bellows tube 6, and the center through hole 52 on the rear cap 5. When mounted, a tightening up screw 44 is threaded into a radial screw hole 431 on the metal ring 43 to fasten the metal ring 43 to the brake cable 10, so as to hold down the control switch 2. The length of the metal spring 7 is shorter than the bellows tube 6. When installed, the metal spring 7 does not touch the rear cap 5.

Figure 5:
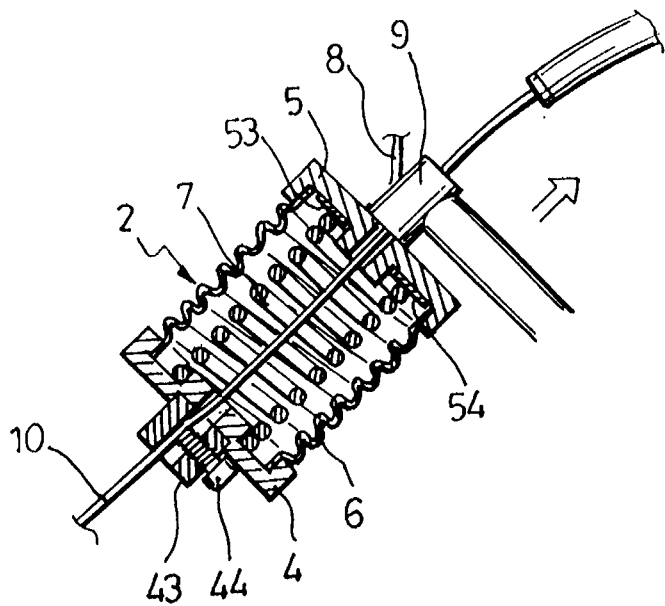

Referring to FIG. 5, when the brake cable 10 is pulled to stop the bicycle, the front cap 4 is forced to move the metal spring 7 toward the rear cap 5, causing the metal spring 7 to contact the first metal contact 53 and the second metal contact 54. When the metal spring 7 touches the first metal contact 53 and the second metal contact 54, the control switch 2 is electrically connected to turn on the lamp assembly 3, causing the lamp assembly 3 to produce a flashing light.

It is to be understood that the drawings are designed for purposes of illustration only, and are not intended as a definition of the limits and scope of the invention disclosed.

What is claimed is:

1. A bicycle stop light for a bicycle having a rear brake and a brake hanger to hold the brake cable of the rear brake, comprising:

(a) a control switch fixed to the brake cable of the bicycle's brake cable, said control switch comprising a rear cap mounted around the brake cable and having a first metal contact and a second metal contact, a front cap mounted around and fixed to the brake cable by a fastening device, a bellows tube stopped between said front cap and said rear cap, a metal spring mounted around the brake cable inside said bellows tube and having a fixed end fixed to said front cap and a free end spaced from said first metal contact and said second metal contact; and (b) a lamp assembly mounted on said bicycle and controlled by said control switch to give a flashing light, said lamp assembly comprising a DC power supply, and a flash lamp set, said DC power supply being connected to said flash lamp set through said first metal contact and said second metal contact;

wherein said front cap is moved by the brake cable to force the free end of said metal spring into contact with said first metal contact and said second metal contact when the brake cable is pulled to stop the bicycle, causing said control switch to turn on said flash lamp set.

2. The bicycle stop light of claim 1 wherein said fastening device comprises a metal ring mounted around the brake Cable and having a radial screw hole, and a tightening up screw threaded into said radial screw hole and stopped against the brake cable.

3. The bicycle stop light of claim 1 wherein said rear cap has a top side stopped against the bicycle's brake hanger.

4. The bicycle stop light of claim 1 wherein said bellows tube is molded from flexible plastics.

5. The bicycle stop light of claim 1 wherein said DC power supply is a battery.

6. The bicycle stop light of claim 1 wherein said lamp assembly further comprises a manual switch for controlling the operation of said flash lamp set manually.

7. The bicycle stop light of claim 1 wherein said lamp assembly is mounted on the rear fender of the bicycle.

* * * * *